Patented Nov. 6, 1951

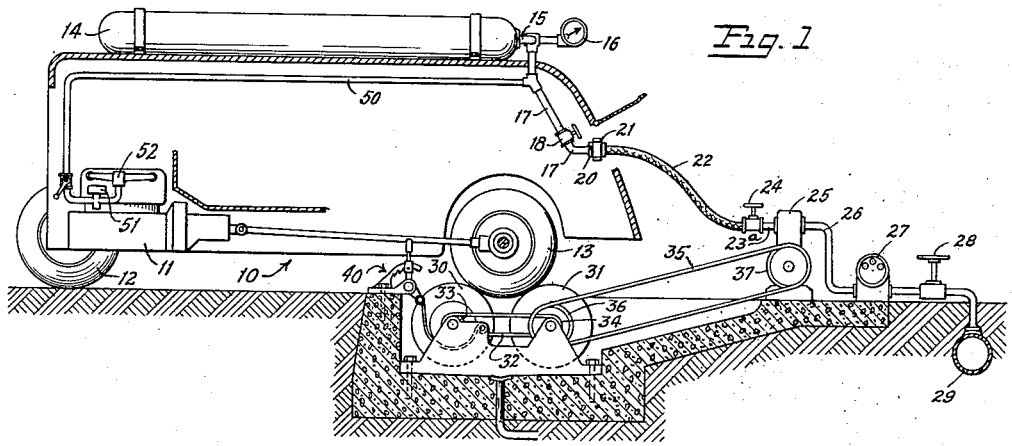
Nov. 6, 1951   R. GODET   2,574,177
GAS FUELING SYSTEM FOR FILLING TRUCK-MOUNTED CONTAINER
BY USING THE POWER OF THE TRUCK MOTOR
Filed Sept. 12, 1945
INVENTOR.
Raymond Godet
Dale A. Bauer
ATTORNEY.

2,574,177

UNITED STATES PATENT OFFICE 2,574,177

GAS FUELING SYSTEM FOR FILLING TRUCK-MOUNTED CONTAINER BY USING THE POWER OF THE TRUCK MOTOR

Raymond Godet, Paris, France

Application September 12, 1945, Serial No. 615,816

6 Claims. (Cl. 222—117)

This invention relates to a fueling system for motor vehicles, and to a filling station.

It was proposed in the early days of the automobile industry to drive internal combustion engines with a gaseous rather than a liquid fuel and during the first World War many vehicles in France and other parts of Europe were provided with containers for the storage of illuminating gas which could be filled from the city gas mains. Those containers usually took the shape of balloons and were fastened to the top of the motor vehicle. Other schemes for supplying the necessary fuel involved the attachment to the motor vehicle of a producer gas unit. All such proposals were unsatisfactory. During the second World War is was proposed also in France to compress illuminating gas or producer gas in tanks to be mounted upon the vehicle. That system was employed to a very considerable extent and was found to be an improvement over the methods earlier developed, but it was by no means so successful an idea that it was in any sense capable of competing with liquid fuel.

An object of this invention is to present a system of supplying gaseous fuel to motor vehicles that is technically efficient, economically advantageous, and capable of competing with gasoline as a fuel. The method and means which I have conceived are particularly adapted to employment in connection with fleet units operating over regular routes.

Heretofore, the cost of installing filling stations for the handling of gaseous fuel has been so great in comparison to the efficiency of the fuel that the establishment of such stations in the absence of compelling conditions such as positive lack of gasoline was not to be considered. It is an object of this invention to combine a fuel of superior efficiency and which is available in large quantities, with new conceptions in the art of supplying gaseous fuel to motor vehicles. In such manner the gaseous fuel may be satisfactorily and advantageously employed in direct competition with gasoline in areas where both are found, and in complete replacement of transported fuel where it is naturally lacking.

The fuel preferably employed in my combination is natural gas, which is more generously distributed throughout the earth and more abundant than oil. Its efficiency is very great in comparison with that of illuminating gas or producer gas, and in some portions of the world, notably the south of France and in the United States, it has received extensive developments for other purposes. However, prior to the conceptions embodied in this specification, the difficulties of transferring it from its source to an automobile were so great that no successful method of accomplishing it is believed to have been invented. In the United States, for example, the mere cost of installing stations adapted to compress the gas to the 150–200 atmospheres found necessary in acceptable French practice was alone sufficient to block the development.

My invention contemplates the establishment along selected routes of pipe lines carrying natural gas at a substantial pressure, for instance, 10 atmospheres, the establishment of filling stations of unique construction at reasonable intervals, and a fuel supply system in which parts mounted on the vehicle cooperate with the parts located at the filling stations to produce a new efficiency and very great technical and economic advantages. These pipe lines are supplied with natural gas from suitable gas wells, and are maintained under substantial pressure by pumps, compressors, or other satisfactory means whenever the natural pressure of the gas is insufficient to meet the requirements of the line.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a diagrammatic view of the preferred form of my invention;

Fig. 2 is a diagrammatic plan view of the combination shown in Fig. 1;

Fig. 3 is a diagrammatic elevational view of another form of my invention; and

Fig. 4 is a sectional view of a simple and satisfactory type of hose connection.

In Fig. 1 numeral 10 indicates generally a bus having a motor 11, steering wheels 12, and driving wheels 13. Upon the top of the bus are carried two metal cylinders 14 which are connected at their ends by pipe 15 which communicates with the interior of each of them in a manner well understood by persons skilled in the art of pipe fitting. Pressure gauge 16 is connected to the end of the pipe 15 and shows the pressure within the cylinders 14. An inlet pipe 17 having a valve 18 is connected to the pipe 15 and is provided at its end with a screw thread 20, as shown in Fig. 4, adapted to receive a screw threaded sleeve 21 of a filling tube 22 having gasket 23 adapted to make sealing contact with the end of the pipe 17. Filling tube 22 is connected to a pipe 23a having a valve 24, the said pipe being connected to the high pressure side of a compressor 25 which is shown in this instance to be of two stage reciprocating type. A very satisfactory compression system comprises a two stage compressor with an air or water cooling device between the stages. One stage reciprocating and other satisfactory types capable of achieving the desired degree of compression can also be used. The compressor 25 is connected by pipe 26 to a meter 27, a valve 28, and a gas main 29. The gas main contains natural gas under substantial pressure, for instance of the order of 10 atmospheres, or more or less. Each of the valves which has so far been described is manually operable.

It is a part of the conception of this invention that the power for operating the apparatus at the filling station shall be furnished by the vehicle that is being serviced. To this end a pair of rollers 30, 31 are mounted in a pit in the station driveway on trunnions or bearings (not shown) at such a level that their upper surfaces are substantially even with the driveway. The rollers are interconnected by chain 32 which passes over sprockets 33 and 34 attached to the roller ends or trunnions. A chain 35 passes over sprocket wheel 36 driven by the roller 31 and over a sprocket 37 that drives the compressor.

This system of the invention may be operated as follows: When refueling of the bus 10 becomes necessary, it is driven into a filling station constructed according to the principles of this invention and backed upon the rollers 30, 31 shown in Fig. 1 so that drive wheels 13 may be made to turn the rollers and operate the compressor. The filling hose 22 is attached to the pipe 17, the valves 18, 24 and 28 are opened, the bus is thrown into gear, the rollers are driven by its driving wheels, and the compressor forces gas into the containers 14. As a result of this invention, it is not essential that the pressure within the containers be raised to the 150-200 atmospheres contemplated in the prior art, satisfactory results being obtained, generally speaking, with pressures more on the order of 30 to 50 atmospheres. Such pressures can be obtained by compressors of comparatively small capacity and inexpensive construction. By the use of these moderate pressures and the installation of filling stations of my design at frequent intervals, the weight of the containers carried by vehicles can be materially reduced and the balance of the vehicles can be improved. The filling is continued until the gauge 16 registers the desired pressure in the containers 14, during which time the meter 27 registers the quantity of gas which has been taken.

When it is desired to remove the bus from the filling station, the motor is disengaged, the valves are closed, the hose 22 is uncoupled, the brake 40 is applied to the drum 30 to prevent it from rotating and the bus is driven off the drums onto the roadway.

The gas in the drums passes through pipe 50 to a pressure regulator 51 of any known design, the function of which is to deliver the gas at constant pressure, to the mixer 52 where it is combined with a quantity of air sufficient to provide a mixture of maximum power. The mixer may also be of satisfactory known design.

By means of this invention filling stations require no engines, and need compressors of only moderate or low pressure. Because of the reduced cost of the filling stations and the superior efficiency of the novel system it is possible to extend pipe lines and to increase the number of stations. The cost of motor vehicles is not increased nor the dead weight made burdening. Gas driven vehicles are thus given new technical efficiency and are placed in a position to compete economically with gasoline driven vehicles.

In the form of the invention shown in Fig. 3 there is diagrammatically shown a modification of the invention wherein a bus indicated generally by the number 60, having driven wheels 61 and steering wheels 62, is propelled by a motor 63 through a gear box 64. Cylinders 14a are mounted on the top of the bus and are connected through a pipe 66 to a regulator 67 and a mixer 68, the connections being substantially the same as those which have been hereinabove described. From the gear box 64 projects a stub shaft 69 which may be joined to a stub shaft 70 by a clutch 71 of any satisfactory type. The stub shaft 70 drives a compressor 72 which may be connected through pipe 73 and inlet hose 74, to a nipple or pipe joint to a gas main 76 having a meter 75. The output end of the compressor 72 is connected through pipe 80 to the pipe 66.

When it is desired to refuel the vehicle of Fig. 3 it is run into a filling station, which may be no more than a pipe projecting from the gas main, and the cylinders thereof are connected thereto by the hose 74, which in this case may be carried on the vehicle. Double valves 81, 82 are opened, the clutch 71 is thrown into engagement so that the stub shaft 69, driven through the gears in the gear box, drives the stub shaft 70 which operates the compressor 72. The pressure obtained will depend upon the capacity of the compressor used. It is possible to obtain pressures of the order hereinabove indicated with compressors of reasonable size. This system requires each motor vehicle to carry its own compressor, which in some circumstances may not be as desirable as the system shown in Fig. 1. Nevertheless, major advantages are obtained from this system, which is well adapted to practical conditions in certain areas.

Particular advantages of the invention arise from the fact that the need for engines at gas filling stations is eliminated. Filling stations can, in favorable instances, be no more than a valve and a simple nipple on the gas line. It is not even necessary to employ a gas meter because the quantity of gas delivered can be computed from the known capacity of the containers and the pressures existing at the commencement and end of refueling. If it is desired to avoid arithmetical computation, tables can be computed that show at a glance the quantity of gas compressed. By means of this invention, natural gas is placed in a position to compete with gasoline as a fuel, particularly in connection with fleets of vehicles operating over established routes. The invention has the potential of establishing a new and substantial industry and of conserving for industrial use the dwindling oil supplies of the world. It is of great value in areas which have no oil but are well supplied with natural gas.

Although only two embodiments of the present invention have been described and illustrated in detail, it is to be expressly understood that the same is not limited thereto. Various changes may be made in the design and arrangement of the parts illustrated without departing from the spirit and scope of the invention, as will now be apparent to those skilled in the art. For a definition of the limits of the invention, reference is had primarily to the appended claims.

What is claimed is:

1. A fueling system for motor vehicles that comprises a pipe line having a plurality of outlet stations and containing combustible gas under pressure of circa 10 atmospheres, a motor vehicle having a gas container which is of weight limited to the acceptance of pressures on the order of 30 to 50 atmospheres and a motor which is fed from said container by means including a gas pipe, and means to fill the tank with gas from the said line including a conduit, a compressor of 30 to 50 atmospheres capacity in the conduit, and means to drive the compressor from the vehicle motor.

2. A fueling system according to claim 1 in which the compressor is mounted upon the vehicle and is connected to the motor thereof by a power takeoff.

3. A fueling system for motor vehicles that comprises a pipe line having a plurality of outlet stations and containing combustible gas under pressure of circa 10 atmospheres, a motor vehicle having a gas container which is of weight limited to the acceptance of pressures on the order of 30 to 50 atmospheres and a motor which is fed from said container by means including a gas pipe, and means to fill the tank with gas from the said line including a conduit, a compressor of 30 to 50 atmospheres capacity in the conduit, means to drive the compressor from the vehicle motor including a pair of rollers drivably connected to said compressor, a driveway whereby the vehicle drive wheels may be driven upon the rollers, and brake means for said rollers.

4. A filling station for vehicles operated by fuel gas comprising a gas pipe line containing a supply of fuel gas under pressure on the order of 10 atmospheres, outlet means in said pipe line, a compressor of 30–50 atmospheres capacity, conduit means constructed and arranged to connect the compressor to the gas container of a vehicle having a gas container, means to connect the compressor to the pipe line, a motor on the vehicle for the propulsion thereof, and means to drive the compressor by power of the said motor of the vehicle being charged.

5. A filling station according to claim 4 in which the means to drive the compressor includes a pair of rollers drivably connected to said compressor, a driveway whereby the vehicle drive wheels may be driven upon the rollers, and brake means for said rollers.

6. A filling station according to claim 4 in which the compressor is mounted upon the vehicle and is connected to the motor thereof by a power takeoff.

RAYMOND GODET.

REFERENCES CITED

The following references are of record in the file of this patent:

UNITED STATES PATENTS

| Number | Name | Date |
|---|---|---|
| 498,888 | Rockwell | June 6, 1893 |
| 1,284,389 | Lovelace | Nov. 12, 1918 |
| 1,443,550 | Wilkinson | Jan. 30, 1923 |
| 1,737,929 | Libby | Dec. 3, 1929 |
| 1,764,057 | Steinhauer | Aug. 5, 1930 |
| 1,772,247 | Forrester et al. | Aug. 5, 1930 |
| 2,014,797 | Davey | Sept. 17, 1935 |
| 2,123,156 | Jogoe | July 5, 1938 |
| 2,326,187 | White | Aug. 10, 1943 |
| 2,384,677 | Hill | Sept. 11, 1945 |
| 2,469,434 | Hansen et al. | May 10, 1949 |
| 2,507,597 | Holdridge | May 16, 1950 |

FOREIGN PATENTS

| Number | Country | Date |
|---|---|---|
| 880,849 | France | Jan. 11, 1943 |